March 26, 1968        G. W. OAKES        3,374,571
TRAP
Filed July 14, 1965
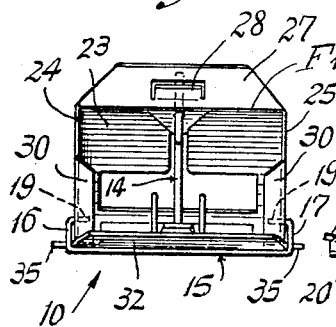
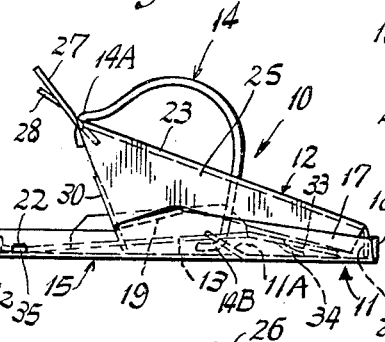
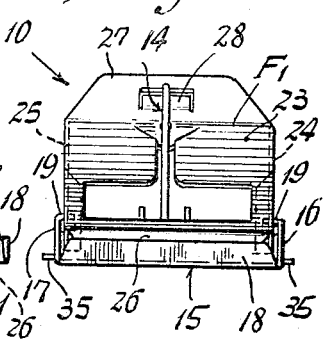
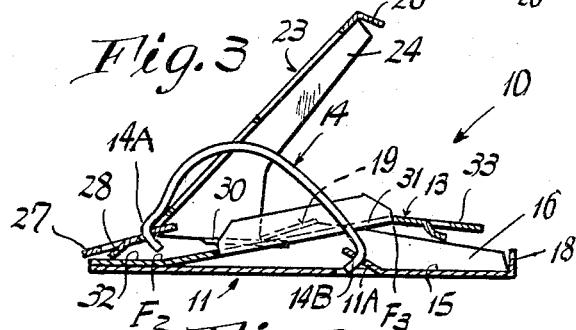
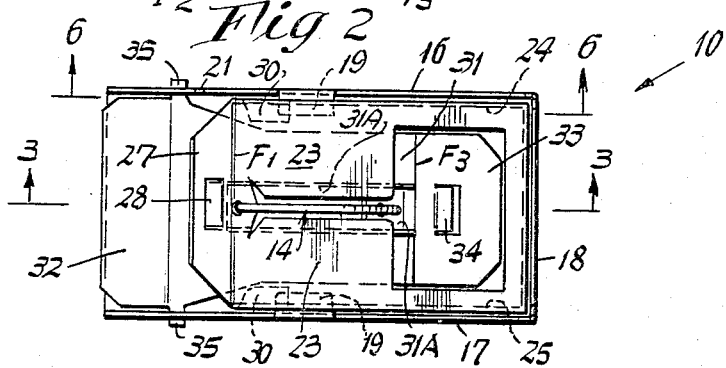
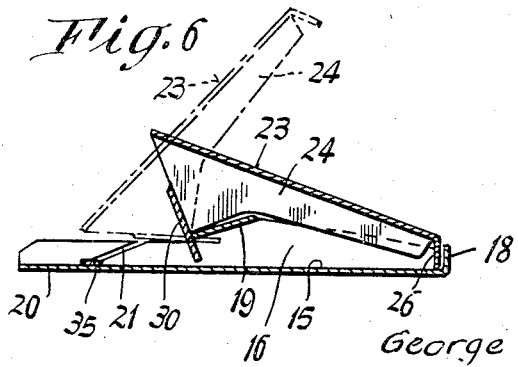
INVENTOR.
George W. Oakes
BY Arthur A. March
ATTORNEY

United States Patent Office 3,374,571
Patented Mar. 26, 1968

3,374,571
TRAP
George W. Oakes, Crystal City, Mo. 63019
Filed July 14, 1965, Ser. No. 471,845
1 Claim. (Cl. 43—83.5)

ABSTRACT OF THE DISCLOSURE

A trap having a fixed jaw member with a jaw end portion and a finger set portion. A movable jaw member is provided also having a jaw end portion and a finger set portion. Each of the jaw members have complementary bearing means intermediate the ends thereof about which the movable jaw member pivots about the fixed jaw member. A trigger is pivotally connected to the fixed jaw member and a C-shaped spring is provided that has its respective end portions anchored to the respective jaw members. Advantageously, the jaw members are maintained in a set open position when the end of the spring anchored to the movable jaw member is disposed below the bearing means of the jaw members.

---

This invention relates in general to a trapping device, and more specifically to a trap having a construction which facilitates setting of the trap and releasing of the animal trapped therein.

Heretofore numerous attempts have been made to enhance and facilitate the setting of the trap and/or releasing of the animal caught within the trap. Generally, the known trap construction consisted of relatively complicated structures that were expensive and relatively difficult to fabricate. Also difficulty was often encountered in setting such traps. With many of the known trap constructions extreme care had to be exercised in setting the trap to avoid accidental springing of the trap and injury to the person setting the same. Another disadvantage of the known trap construction was that difficulty was often encountered in releasing the animal caught within the trap. Usually the releasing of the animal necessitated the operator to handle the dead animal caught within the trap. Handling of the dead animal was therefore a disagreeable task for most persons clearing the trap, particularly to a housewife clearing a mouse trap.

It is, therefore, an object of this invention to provide an improved trap construction in which the setting of the trap and/or releasing of the animal caught therein is facilitated and enhanced.

Another object is to provide an improved trap construction wherein the trap may be readily set in a relatively simple manner whereby injury from an accidental springing of the trap is completely prohibited.

Another object of this invention is to provide an improved trap construction wherein the animal caught therein can be readily released from the trap without the necessity of having to touch or handle the animal.

Another object of this invention is to provide a trap construction composed of relatively few simple parts which can be readily fabricated by a simple stamping operation.

Another object of this invention is to provide an improved trap construction having unique structural features which greatly simplify the manufacturing and assembly of the trap.

The foregoing objects and other features and advantages are attained by a trap construction comprised essentially of a fixed jaw member formed as a relatively simple stamping and a movable jaw member formed as an equally simple stamping with novel wear resistant bearing means for pivotally connecting the movable jaw with respect to the fixed jaw member. One end portion of the respective fixed and movable jaw members define complementary jaw portions, adapted to secure or entrap an animal therebetween; and the other end portions of the respective jaw members defining finger gripping portions utilized for setting and/or releasing the animal from the trap.

A trigger means is hingedly connected to the fixed jaw member adjacent the finger grip portion thereof, and a novel spring means is utilized for maintaining the fixed jaw members in a set open position, or which when displaced, snaps the movable jaw member to closed position relative to the fixed jaw member. In accordance with this invention the spring means comprises a C-shaped spring having its opposed end portions anchored to the respective jaw members. The arrangement is such that the trap is set when the end of the spring connected to the movable jaw is disposed below the bearing about which the movable jaw pivots to the fixed jaw. Thus the trap will set in a manner requiring very little effort to hold or release the trigger. Accordingly, with the finger grip end portions of the trap opposite the jaw forming portion, the trap may be set or released simply by pressing the finger grip portions together.

A feature of this invention resides in the provision of a trap construction comprising only three relatively simple parts cooperatively associated and maintained in assembled position by a spring of unique design.

Another feature of this invention resides in a novel bearing means by which the movable jaw member is pivotally related to the fixed jaw member.

Another feature of this invention resides in the provision of a trap construction wherein the respective components thereof may be assembled without the need of pins, rivets, or other means that require extensive machine work.

Another feature of this invention resides in the provision that the respective component parts of the trap construction can be fabricated as relatively simple stampings.

Other features and advantages will become more readily apparent when considered in view of the drawings and specifications in which, FIGURE 1 is a side elevation view of the trap of the instant invention illustrated in its closed position.

FIGURE 2 is a plan view of the trap construction of FIGURE 1.

FIGURE 3 is a sectional view taken along line 3—3 of FIGURE 2, but illustrating the component parts of the trap in their set or open position.

FIGURE 4 is a left end view of FIGURE 1.

FIGURE 5 is a front end view of FIGURE 1.

FIGURE 6 is a section view taken along line 6—6 of FIGURE 2, the dot-dash lines thereof illustrating the position of the movable jaw in the set or open position of the trap.

Referring to the drawings there is disclosed therein the improved trap construction 10 of the instant invention. As shown, the trap construction comprises a fixed jaw member 11, a movable jaw member 12, a trigger means 13, and a spring means 14 for maintaining the component parts of the trap in an assembled position.

The fixed jaw member comprises a plate 15 having upwardly turned flange portions 16, 17 extending along the sides and a flange 18 at the front end. The flange portion 18 located at the front of the fixed jaw member 11 may be serrated, if desired to define teeth to secure an animal between the jaw portions of the trap, as will hereinafter become more apparent. Intermediate the ends of each of the side flanges 16, 17 there is provided an inturned ear or flap 19. As shown the inturned ear 19 is disposed at an angle with respect to the horizontal.

The end portion of the fixed jaw member 11 opposite the jaw end portion thereof defines a finger grip or holding portion 20, which is utilized to enhance the setting of the trap or the releasing of the animal trapped between the jaws, as will become hereinafter more apparent.

Adjacent the finger end portion 20 of the fixed jaw member, one of the side flanges 16 is provided with an inclined slot 21, as best seen in FIGURE 6. The other side flange 17, opposite the slot 21, is provided with a slotted opening 22, as best seen in FIGURE 1. As will be hereinafter described the slot 21 and opening 22 define the means for securing thereto the trigger member 13.

The movable jaw 12 comprises a plate member having a web or top 23 terminating in opposed depending side flanges 24, 25. The side flanges 24, 25 of the movable jaw member are set slightly inwardly of the complementary side flange portions 16, 17 of the fixed jaw member 11. The leading or front end of the movable jaw member is also provided with a downwardly turned flange 26 to define jaw end portions complementary to that of the fixed jaw end portion.

In accordance with this invention the end of the movable jaw member opposite the jaw end portion thereof is bent along a fold line F1 in an upwardly and outwardly direction to define a finger grip or hold 27. Blanked out of the plane of this finger grip portion 27 is a tab 28 which is inwardly bent to engage and set the trigger 13 in the open or set position of the jaw, as will be hereinafter more fully set forth. Thus, the respective fixed jaw member 11 and movable jaw member 12 can be formed of a suitable metal stamping or the like that can be readily fabricated in a relatively simple and expedient manner. The side flanges of the movable jaw member are provided with oppositely disposed, inwardly turned, or bent bearing lugs 30. As best seen in FIGURES 1 and 6 the inturned bearing lugs 30 are disposed substantially normal to the edge of the inturned ears 19 of the side flanges 16, 17 of the fixed jaw member and in contiguous relationship thereto. The arrangement is such that the bearing lugs 30 of the movable jaw member 12 are free to pivot about the edge of the bearing ears 19, thus providing a wear resistance pivoting or hinging means for the movable jaw member 12 relative to the fixed jaw member 11.

In accordance with this invention the trigger member 13 is disposed between the movable jaw member 12 and the fixed jaw member 11. As best seen in FIGURE 2, the trigger member 13 comprises a metal stamping which comprises a central portion 31 having oppositely bent end portions 32, 33 integrally connected thereto. As shown, the end portion 32 of the trigger disposed between the finger grip portions 20, 27 is upwardly bent about a fold line F2 with respect to the center portion 31 of the trigger. The other end portion 33 of the trigger is downwardly bent about a fold line F3 with respect to the central portion 31. If desired, the downwardly bent portion 33 of the trigger 13 may be provided with a blanked out flap 34 which may be utilized to facilitate securing to the trigger of a suitable bait.

The upwardly bent portion 32 of the trigger is disposed between the finger grip portions 20, 27 of the trap of the movable and fixed jaw members in the set position thereof. In the set position the bent tab 28 of the finger grip portion 27 of the movable jaw member 12 will engage or contact the upwardly bent portion 32 of the trigger means thereby causing the trigger 13 to pivot to its set position, as shown in FIGURE 2, when the movable jaw 12 is set to its opened position.

The trigger member 13 is hingedly connected to the upturned side flanges 16, 17 of the fixed jaw member 11 by means of lateral extending pins or tabs 35 integrally formed therewith. Accordingly, one of the tabs or pins 35 is adapted to engage the slot 21 in flange 16, while the other pin 35 is adapted to be fitted into the opening 22 in flange 17. Thus, the trigger 13 may be readily assembled to the base member 11 in a relatively simple and expedient manner. The center portion 31 of the trigger is provided with an elongated slot 31A to permit the passage of the spring member 14 therethrough which biases the movable jaw 12 relative to the fixed jaw.

As shown, spring means 14 for rendering the trap operative comprises a substantially C-shaped wire spring having its respective end portions 14A, 14B anchored in suitable anchoring means located on both the fixed jaw member and the movable jaw member. The fixed jaw member 11 is provided with a blanked out tab 11A which has an opening formed therein through which one end 14B of the C-shaped spring is extended and anchored, the end of the spring being bent relative to the tab to insure that the spring is positively secured thereto. The other end 14A of the spring 14 is hooked into an aperture formed in the movable jaw member 12 adjacent the finger grip portion 27 thereof. Accordingly, the spring 14 in the normal closed position of the trap, as indicated in FIGURE 1, will maintain the bearing lug 30 of the movable jaw member 12 pressed or biased against the ear 19 of the fixed jaw member 11.

To set the trap it will be apparent that one need only grip between his thumb and forefinger the finger grip portions 20, 27 of the respective fixed jaw member 11 and the movable jaw member 12 whereby a pressure applied thereto will pivot the movable jaw member 12 to a position indicated in FIGURE 3. In the pivoted position, as shown in FIGURE 3, the end 14A of the spring anchored to the movable jaw member 12 is moved to a position where it is below the bearing point at which the bearing lugs 30 bear on ears 19. Since the spring 14 has passed through its dead center, the jaws are maintained in open position as indicated. In this position, it is to be also noted that the bent tab 28 in the finger grip 27 portion of the movable jaw 12 engages the upwardly turned portion 32 of the trigger 13, thereby causing the trigger 13 to be pivoted so that the other end portion 33 thereof is spaced above the base 15 of the fixed jaw member 11. Accordingly, an appropriate bait may be connected to the raised portion 33 of the trigger. It will then be apparent that as an animal approaches the trap and nibbles on the bait put on the end of the trigger, the slightest downward movement of the trigger 11 will cause the opposite end 32 of the trigger to displace the movable jaw 12 so that anchoring portion 14A of the spring is moved above the level of the bearing point to automatically and positively cause the movable jaw 12 to be pivoted toward its closed position, thereby trapping the animal between the jaw portions of the trap. Accordingly, with the trap sprung the animal is securely caught.

To release the animal from the trap, one need only to grip the finger portions 20, 27 of the respective movable and fixed jaw members and squeeze the same together in the same manner as though setting the trap to open the jaws. Thus, the instant the movable jaws open, the animal is released. It will therefore be apparent that setting of the trap and/or releasing of the animal caught therein can be readily attained without the need of the operator endangering himself by accidently springing the trap and/or handling the carcass of the animal to release it.

Also the respective component parts of the trap are constructed and arranged so that they can be readily formed of simple stampings, and assembled in a simple and expedient manner without the use of any pins, rivets, or other features requiring extensive machine work. As a consequence, costs of labor, material and time of assembly are greatly reduced whereby the savings are passed on to the ultimate consumer.

While the instant invention has been described with respect to a particular embodiment thereof, it will be readily appreciated and understood that variations and modifications of the invention may be made without departing from the scope or spirit of the invention.

What is claimed is:

1. A trap comprising a fixed jaw member in the form of a fixed plate having a jaw end portion and a finger set end portion, said fixed plate having a pair of upwardly turned flanges extending along the side thereof, said upwardly turned flanges each having an inturned flap disposed at an angle with respect to said fixed plate, a movable jaw member in the form of a movable plate having a jaw end portion and a finger set portion, said movable plate having a web portion and a pair of depending side flanges extending along the side thereof, said depending side flanges each having an inwardly turned bearing lug cooperating with said flaps on said fixed plate, said bearing lugs being disposed at an angle with respect to said movable plate and form a hinge in cooperation with said flaps on said fixed plate, said jaw end portions being disposed on one side of said hinge and said finger set end portions being disposed on the other side of said hinge, a trigger pivotally mounted on said fixed plate between said upwardly turned flanges thereon and positioned to engage the finger set portion of said movable jaw member, a spring having one end attached to the jaw end portion of said fixed plate intermediate the ends thereof and having its opposite end connected to the finger set portion of said movable plate adjacent one end thereof, said spring being C-shaped to bias said movable jaw member towards said fixed jaw member so that the said lugs of said movable plate are biased against said flaps of said fixed jaw member, said jaw members being maintained in an open position when the end of said spring anchored to said movable jaw member is positioned below said hinge.

References Cited

UNITED STATES PATENTS

| 965,318 | 7/1910 | Opperud | 43—83.5 |
| 1,016,170 | 1/1912 | Opperud | 43—83.5 |
| 2,138,092 | 11/1938 | Evans | 43—83.5 |
| 2,636,310 | 4/1953 | Oakes | 43—83.5 X |
| 2,639,539 | 5/1953 | Oakes | 43—83.5 |

FOREIGN PATENTS 604,021  6/1948  Great Britain.

SAMUEL KOREN, *Primary Examiner.*

WARNER H. CAMP, *Assistant Examiner.*